United States Patent
Kucharski et al.

(10) Patent No.: US 11,975,739 B2
(45) Date of Patent: May 7, 2024

(54) DEVICE AND METHOD FOR VALIDATING A PUBLIC SAFETY AGENCY COMMAND ISSUED TO A VEHICLE

(71) Applicant: MOTOROLA SOLUTIONS, INC., Chicago, IL (US)

(72) Inventors: Wojciech Kucharski, Rzeszow (PL); Pawel Jurzak, Cracow (PL); Grzegorz Kaplita, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 442 days.

(21) Appl. No.: 17/287,123

(22) PCT Filed: Dec. 6, 2018

(86) PCT No.: PCT/PL2018/050062
§ 371 (c)(1),
(2) Date: Apr. 21, 2021

(87) PCT Pub. No.: WO2020/117073
PCT Pub. Date: Jun. 11, 2020

(65) Prior Publication Data
US 2021/0380138 A1 Dec. 9, 2021

(51) Int. Cl.
*B60W 60/00* (2020.01)
*B60R 13/10* (2006.01)
*H04W 4/40* (2018.01)

(52) U.S. Cl.
CPC ......... *B60W 60/0017* (2020.02); *H04W 4/40* (2018.02); *B60R 13/10* (2013.01); *B60W 2556/45* (2020.02)

(58) Field of Classification Search
None
See application file for complete search history.

(56) References Cited

U.S. PATENT DOCUMENTS

| 5,844,987 A | 12/1998 | Matthews et al. |
| 8,893,416 B1 | 11/2014 | McKenzie |

(Continued)

FOREIGN PATENT DOCUMENTS

| JP | 2002024994 A | 1/2002 |
| WO | 9829850 A1 | 7/1998 |

(Continued)

OTHER PUBLICATIONS

6 Vehicle-to-Vehicle (V2V) Communication Startups, nanalyze, downloaded from internet: Feb. 17, 2021, https://www.nanalyze.com/2017/04/6-vehicle-v2v-communication-startups/, all pages.

(Continued)

*Primary Examiner* — Christian Chace
*Assistant Examiner* — Shayne M. Gilbertson

(57) ABSTRACT

A process for validating a public safety agency command issued to a vehicle. In operation, a public safety agency controller receives a public safety agency command validation inquiry from a vehicle communication device. The inquiry indicates that the vehicle communication device has detected a public safety agency command issued to the vehicle and includes a first vehicle identifier and a first vehicle location. The controller receives a public safety agency command information including a second vehicle identifier and a second vehicle location from a public safety agency communication device. The validity of the public safety agency command is determined based on comparing the first vehicle identifier with the second vehicle identifier and comparing the first vehicle location with the second vehicle location. The controller then transmits a notification to the vehicle communication device identifying the validity of the public safety agency command.

20 Claims, 4 Drawing Sheets

(56) References Cited

U.S. PATENT DOCUMENTS

| | | | |
|---|---|---|---|
| 11,546,754 B1* | 1/2023 | Salter | H04W 12/009 |
| 2004/0218785 A1* | 11/2004 | Kim | G08G 1/0175 |
| | | | 382/105 |
| 2006/0152354 A1* | 7/2006 | Jones | G08B 25/08 |
| | | | 340/505 |
| 2010/0209006 A1 | 8/2010 | Grigsby et al. | |
| 2012/0123667 A1* | 5/2012 | Gueziec | G08G 1/0133 |
| | | | 701/119 |
| 2014/0249735 A1* | 9/2014 | Levine | G01C 21/3438 |
| | | | 701/117 |
| 2015/0057838 A1* | 2/2015 | Scholl | H04W 4/46 |
| | | | 701/2 |
| 2016/0144867 A1 | 5/2016 | Delp et al. | |
| 2017/0208355 A1 | 7/2017 | Bougucki et al. | |
| 2020/0021431 A1* | 1/2020 | Mondello | H04W 12/041 |

FOREIGN PATENT DOCUMENTS

| | | |
|---|---|---|
| WO | 0155902 A1 | 8/2001 |
| WO | 2018208544 A1 | 11/2018 |
| WO | 2020022912 A1 | 1/2020 |

OTHER PUBLICATIONS

The International Search Report and the Written Opinion corresponding patent application No. PCT/PL2018/050062 filed Dec. 6, 2018, all pages.

* cited by examiner

DEVICE AND METHOD FOR VALIDATING A PUBLIC SAFETY AGENCY COMMAND ISSUED TO A VEHICLE

This application is a National Stage filing under 35 USC § 371 of co-pending Patent Cooperation Treaty international application having Serial No. PCT/PL2018/050062 (the 'PCT international application') filed on Dec. 6, 2018. This application claims priority to the PCT international application, the entire contents of which are incorporated herein by reference.

BACKGROUND OF THE INVENTION

First responders, such as police officers signal vehicles to stop when there is a need to investigate a possible crime or a violation of law. It is possible that the person signaling the vehicle is not an authorized person to command vehicles to stop. Current technical solutions do not enable vehicle drivers to readily determine whether the person signaling the vehicle is authorized by concerned agencies to command vehicles to stop. Vehicle drivers may also fail to notice or comprehend the signal issued towards the vehicle. This may lead to vehicle drivers not complying with the signals issued by officers and there is a possibility that the situation may escalate and/or lead to a waste of public safety resources when the officer calls in to report the vehicle or gets involved in the pursuit of the vehicle. On the other hand, when the vehicle is stopped in response to a signal by an unauthorized person, this may pose security risk to the vehicle and its occupants.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
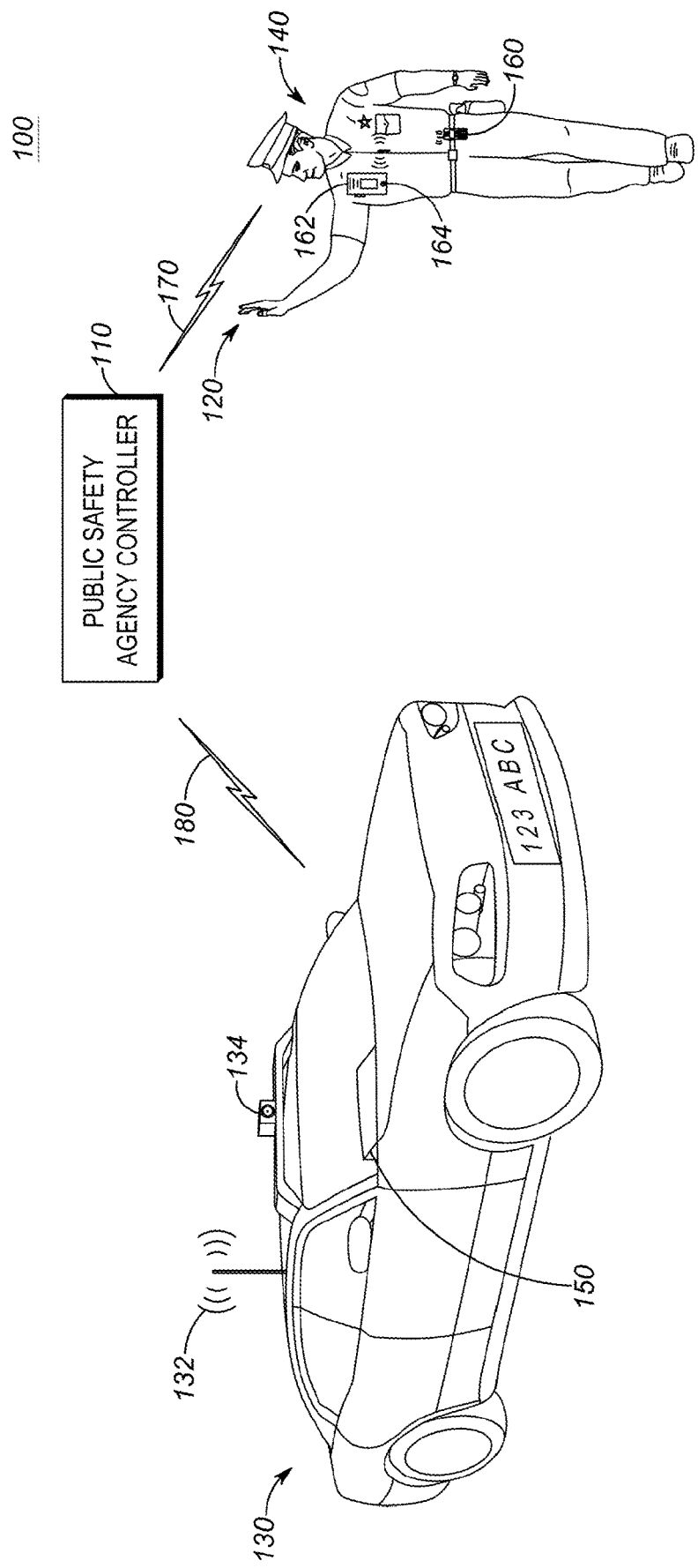
FIG. 1 is a system diagram illustrating a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, it is important for vehicle drivers to comply with public safety agency commands issued by authorized officers. However, there is also a technological need to validate such commands and notify the vehicle drivers of the validation of such commands. Also, in case of autonomous vehicles such as driverless cars that are capable of being driven with little or no human input, there is a further technological need to automatically control such autonomous vehicles to take an action to follow the command after a determination that the command is valid.

One embodiment provides a method of operating a public safety agency controller to validate a public safety agency command issued to a vehicle. The method includes: receiving, from a vehicle communication device, a public safety agency command validation inquiry indicating that the vehicle communication device has detected a public safety agency command issued to the vehicle, the public safety agency command validation inquiry including a first vehicle identifier and a first vehicle location; determining whether public safety agency command information is received from a public safety agency communication device, the public safety agency command information indicating that the public safety agency communication device has detected a public safety agency command issued to the vehicle and further including a second vehicle identifier and a second vehicle location; responsive to determining that the public safety agency command information is received from the public safety agency communication device, determining a validity of the public safety agency command issued to the vehicle, at least in part, by comparing the first vehicle identifier with the second vehicle identifier and comparing the first vehicle location with the second vehicle location; and transmitting a notification to the vehicle communication device identifying the validity of the public safety agency command issued to the vehicle.

Another embodiment provides a public safety agency controller that includes a network interface and an electronic processor communicatively coupled to the network interface. The electronic processor is configured to: receive, via the network interface, from a vehicle communication device, public safety agency command validation inquiry indicating that the vehicle communication device has detected a public safety agency command issued to a vehicle, the public safety agency command validation inquiry including a first vehicle identifier and a first vehicle location; determine whether public safety agency command information is received from a public safety agency communication device associated with a public safety agency, the public safety agency command information indicating that the public safety agency communication device has detected a public safety agency command issued to the vehicle and further including a second vehicle identifier and a second vehicle location; determine a validity of the public safety agency command issued to the vehicle, at least in part, by comparing the first vehicle identifier with the second vehicle identifier and comparing the first vehicle location with the second vehicle location, when it is determined that the public safety agency command information is received from the public safety agency communication device; and transmit, via the network interface, a notification to the vehicle communication device associated with the vehicle, the notification identifying the validity of the public safety agency command issued to the vehicle.

A further embodiment provides a method of operating a public safety agency controller to validate a public safety agency command issued to a vehicle. The method includes: receiving, from a vehicle communication device, a public safety agency command validation inquiry indicating that the vehicle communication device has detected a public safety agency command issued to the vehicle, the public safety agency command validation inquiry including a vehicle identifier and a vehicle location; identifying one or more users authorized to issue a public safety agency command and further located within a predefined geographical distance from the vehicle location; forwarding the public safety agency command validation inquiry to respective public safety agency communication devices associated with the identified one or more users; receiving a public safety agency command validation response from the respective public safety agency communication devices; determining a validity of the public safety agency command based on the public safety agency command validation response received from the respective public safety agency communication devices; and transmitting a notification to the vehicle communication device identifying the validity of the public safety agency command issued to the vehicle.

Each of the above-mentioned embodiments will be discussed in more detail below, starting with example communication system and device architectures of the system in which the embodiments may be practiced, followed by an illustration of processing steps for achieving the method, device, and system described herein. Further advantages and features consistent with this disclosure will be set forth in the following detailed description, with reference to the figures.

Referring now to the drawings, and in particular FIG. 1, a communication system diagram illustrates a system 100 including a public safety agency controller 110 that is operated to validate a public safety agency command 120 issued to a vehicle 130. The public safety agency command 120 may be issued by a public safety agency officer 140 including, but not limited to, a police officer. As depicted in FIG. 1, the public safety agency command 120 may correspond to a hand gesture made by the public safety agency officer 140 towards the vehicle 130 and may represent a "STOP" signal indicating that the vehicle 130 should be stopped for further interaction with the public safety agency officer 140. While FIG. 1 depicts a public safety agency command 120 in the form of a hand gesture, a public safety agency officer 140 may use different resources to get the attention of the vehicle 130. For example, a public safety agency command 120 may be issued in the form of visual warnings (e.g., issued through equipment such as a light bar, rotating beacon mounted on a vehicle), audio warnings (e.g., issued through equipment such as sirens, loudspeaker etc., mounted on a vehicle), or by pointing or placing sign labels/indicators (e.g., with "STOP" sign label) to signal a target vehicle. Further, while FIG. 1 shows a public safety agency command 120 as being a hand gesture corresponding to a "STOP" signal, a public safety agency officer 140 may issue other types of public safety agency commands to get the attention of the target vehicle 130. Different types of commands may necessitate different types of actions by the vehicle 130 in order for the vehicle 130 to comply with the command 120. For example, when the command 120 indicates that the vehicle 130 should stop, the vehicle 130 may take an action to pull over to the side of the road and stop after being notified by the public safety agency controller 110 that the public safety agency command 120 is valid in accordance with embodiments. As another example, the public safety agency officer 140 may notice a vehicle intending to park at an unauthorized location and may issue a public safety agency command 120 to not park at the location. In such cases, the vehicle 130 may take an action to not park at the location after being notified by the public safety agency controller 110 that the public safety agency command 120 is valid.

In accordance with some embodiments, the public safety agency communication device 160 may be operated or associated with the public safety agency officer 140, who may carry or wear the public safety agency communication device 160. For example, the public safety agency communication device 160 may correspond to a portable communication device that the public safety agency officer 140 may wear, such as a primary battery-powered portable radio (as shown in FIG. 1) used for narrowband and/or broadband direct-mode or infrastructure communications. In some embodiments, the public safety agency communication device 160 may be externally deployed (i.e., not carried or operated by the public safety agency officer 140 issuing the public safety agency command 120), for example, at selected locations, and operated to detect public safety agency command 120 issued by officers deployed at the selected locations. In yet other embodiments, the public safety agency communication device 160 may be a communication device that is integrated with a vehicle in which the public safety agency officer 140 may be an occupant. In any case, the public safety agency communication device 160, after determining that a public safety agency command 120 has been issued by the public safety agency officer 140 towards a target vehicle 130, further operates to identify and store vehicle information (such as vehicle identifier and vehicle location). In some embodiments, the public safety agency communication device 160 also transmits public safety agency command information including the vehicle information to the public safety agency controller 110.

In accordance with some embodiments, the public safety agency officer 140 can have any number of communication and computing devices and any one or combination of such communication and computing devices that can be configured to detect the public safety agency command 120 issued by the public safety agency officer 140 as well as to transmit the public safety agency command information to the public safety agency controller 110. For example, a video camera 164 and a remote speaker microphone 162 may be used for capturing video and/or audio of a field-of-view associated with the public safety agency officer 140. The captured video and/or audio of a field-of-view can be analyzed by the device 160 to detect whether a public safety agency command 120 has been issued by the public safety agency officer 140. For example, when the public safety agency command 120 issued to the vehicle 130 corresponds to a gesture made by the public safety agency officer 140 towards the vehicle 130, the public safety agency communication device 160 detects a public safety agency command 120 and the corresponding type by capturing an image or video of the gesture through the video camera 164 and further processing the image or video using an object recognition/video analytics engine. As another example, when the public safety agency command 120 issued to the target vehicle 130 corresponds to a voice command issued (e.g., using a loudspeaker) by the public safety agency officer 140, the public safety agency communication device 160 detects a public safety agency command 120 and the corresponding type by capturing the voice command via a microphone 162 and further processing the voice command using an audio analytics engine that employs natural language processing algorithms. Similarly, the public safety agency communication device 160 may also detect that a public safety agency command 120 has been issued to a particular target vehicle based on information received from sensors (e.g., sensors deployed in relation to the public safety agency officer 140 or public safety agency vehicle associated with the officer 140). For example, the sensors can detect whether siren or light bar has been activated and provide this indication to the public safety agency communication device. The public safety agency officer 140 may also provide an input (verbal or text input) at the public safety agency communication device 160 indicating that the public safety agency command 120 of a particular type has been issued to a vehicle 130.

The public safety agency communication device 160 is configured to further identify a target vehicle (i.e., a particular vehicle from among multiple vehicles located at a given location) for which the public safety agency command 120 has been issued. In one embodiment, the public safety agency communication device 160 may automatically identify a target vehicle (e.g., vehicle 130) based on the proximity of the public safety agency officer to the target vehicle. For example, if there are multiple vehicles at a given location, the vehicle 130 that is closest to the public safety agency officer may be identified as the target vehicle. In other embodiments, the public safety agency communication device 160 may identify the vehicle 130 based on a direction in which the public safety agency officer's 140 hand or finger is pointing or based on officer's eye gaze direction at the time of issuing the public safety agency command 120. In other embodiments, the public safety agency officer 140 may also provide an input identifying a particular vehicle as the target vehicle 130. In this case, the public safety agency officer 140 may provide one or more vehicle identifiers (e.g., license plate number, color of the car etc.) that uniquely identify the target vehicle 130. Furthermore, while the vehicle 103 is depicted as a land-based vehicle, such as a car, a truck, a van, and the like, the vehicle 103 may, in some examples, comprise a water-based vehicle, such as a boat, and the like, and/or, in other examples, comprise an air-based vehicle such as a plane, a helicopter, and the like.

The public safety agency communication device 160, after detecting that the public safety agency command 120 has been issued and further after determining that the public safety agency command 120 has been issued to a particular target vehicle 130, generates public safety agency command information for storage and/or transmission to the public safety agency controller 110. In some embodiments, the public safety agency communication device 160 transmits the public safety agency command information to the public safety agency controller 110 via a wireless communication link 170, in accordance with one or more wireless air-interface protocols, that are implemented in one or more public safety communication networks such as land mobile (LMR) networks, association of public safety communication officials (APCO) Project 25 (P25) networks, and public safety long term evolution (LTE) networks.

The public safety agency command information indicates that a public safety agency communication device 160 has detected a public safety agency command 120 issued to a target vehicle 130 and also further includes a vehicle identifier and a vehicle location. The vehicle identifier includes one or more of: a license plate number of the vehicle; a vehicle owner identifier; one or more visual or driving characteristics identifying the vehicle including type of the vehicle, color of the vehicle, and vehicle manufacturer identifier. In accordance with some embodiments, automated license plate recognition (ALPR) software may be used to capture license plate number of the vehicle. ALPR software processes image/video data of the vehicle to extract license plate number. Similarly, object recognition and video analytics software may be used to extract visual or driving characteristics of the vehicle.

The vehicle location corresponds to a location at which the public safety agency command 120 has been issued. In one embodiment, the location of the public safety agency officer 140 may be used a proxy for the vehicle location. For example, the location of the public safety agency officer 140 may include location data obtained from a location determination device (e.g., global positioning system (GPS) device) coupled to the public safety agency communication device 160. In some embodiments, video analysis software analyzing video from a fixed street camera (e.g., at a toll way), an unmanned aerial vehicle, or both provides information about the vehicle location. For example, automated license plate recognition (ALPR) software analyzing video from a fixed street camera may detect a license plate of the vehicle. Combining this detection with a known location of the fixed street camera indicates to the public safety agency communication device 160 that the target vehicle 130 is at the location of the fixed street camera. ALPR software may also detect the license plate of a vehicle in video captured by a camera on an unmanned aerial vehicle (e.g., drone aircraft). The detection, in combination with location and camera direction information from the unmanned aerial vehicle, indicates an estimated location of the vehicle 130.

In accordance with some embodiments, the vehicle 130 is an autonomous vehicle (also referred to as self-driving vehicle) that is operable under control of a vehicle controller (not shown) and a transceiver 132 coupled to a vehicle communication device 150 and optionally in cooperation with a video camera 134 (which may include a visible-light camera, an infrared camera, a time-of-flight depth camera, and/or a light detection and ranging (LiDAR) device)) that is mounted to the vehicle 130. The vehicle 130 may include a location (and/or orientation) determination device integrated with or separately disposed in the vehicle communication device 150 for determining (and storing and/or transmitting) a location (and/or orientation) of the vehicle 130.

In accordance with some embodiments, the vehicle communication device 150 is configured to detect a public safety agency command 120 that has been issued to the vehicle 130. The vehicle communication device 150 further generates and transmits a public safety agency command validation inquiry to the public safety agency controller 110. The public safety agency command validation inquiry indicates that the vehicle communication device 150 has detected a public safety agency command 120 issued to the vehicle 130, and further includes a vehicle identifier and a vehicle location. The vehicle identifier includes one or more of: a license plate number of the vehicle; a vehicle owner identifier; one or more visual or driving characteristics identifying the vehicle including type of the vehicle, color of the vehicle, and vehicle manufacturer identifier. The vehicle location corresponds to a location at which the public safety agency command 120 has been issued, and further includes a geographical location of the vehicle. The location may be identified based on information received from a location determination device (e.g., GPS device) that is integrated to the vehicle communication device 150. In some embodiments, the vehicle communication device 150 transmits the public safety agency command validation inquiry via a wireless communication link 180, in accordance with one or more wireless air-interface protocols, that are implemented in one or more non-public safety agency communication networks, such as LTE networks, global system for mobile communications (GSM) networks, and universal mobile telecommunications system (UMTS) networks.

The vehicle communication device 150 detects a public safety agency command 120, for example, by capturing, via the video camera 134, a video of the public safety agency officer 140 and his/her surroundings. The captured video can then be analyzed to detect whether a public safety agency command 120 has been issued by the public safety agency officer 140. For example, when the public safety agency command 120 issued to a target vehicle 130 corresponds to a gesture made by the officer 140 towards the vehicle 130, the vehicle communication device 150 detects a public safety agency command 120 by capturing an image or video of the gesture through the camera 134 and further processing the image or video using an object recognition/video analytics engine to identify that the gesture corresponds to a particular type of public safety agency command 120. As another example, when the public safety agency command 120 issued to the vehicle 130 corresponds to a voice command (e.g., via a loud speaker) issued by the police officer, the vehicle communication device 150 detects a public safety agency command 120 by capturing the voice command via a microphone and further processing the voice command using an audio analytics engine that employs natural language processing algorithms to identify that the voice command corresponds to a public safety agency command 120. Similarly, the vehicle communication device 150 may also detect that a public safety agency command 120 is issued responsive to detecting one of sirens or lightbar being activated on the public safety agency vehicles. In some embodiments, an occupant of the vehicle 130 may provide an input (verbal or text input) at the vehicle communication device 150 indicating that the public safety agency command 120 of a particular type has been issued to the vehicle 130.

In accordance with some embodiments, the public safety agency controller 110 performs a public safety agency command validation process when the public safety agency controller 110 receives a public safety agency command validation inquiry from a vehicle communication device 150 that detected a public safety agency command 120 issued to the vehicle 130. The public safety agency controller 110 performs the public safety agency command validation process by comparing information included in the command validation inquiry with information received from a public safety agency communication device 160 that also detected a public safety agency command 120 which is issued from an associated public safety agency officer 140 to a target vehicle 130. After performing the validation process, the public safety agency controller 110 transmits a notification to the vehicle communication device 150 identifying the validity (i.e., whether valid or invalid) of the public safety agency command 120. The vehicle 130 may take a corresponding action (e.g., to stop the vehicle in case the command 120 is valid) based on the validity of the public safety agency command 120 received via the vehicle communication device 150. In other embodiments, the public safety agency controller 110 forwards the received public safety agency command validation inquiry to a public safety agency communication device 160 that is located within a predefined distance from the vehicle location and further performs the command validation process based on the responses received from the public safety agency communication device 160.

Figure 2:
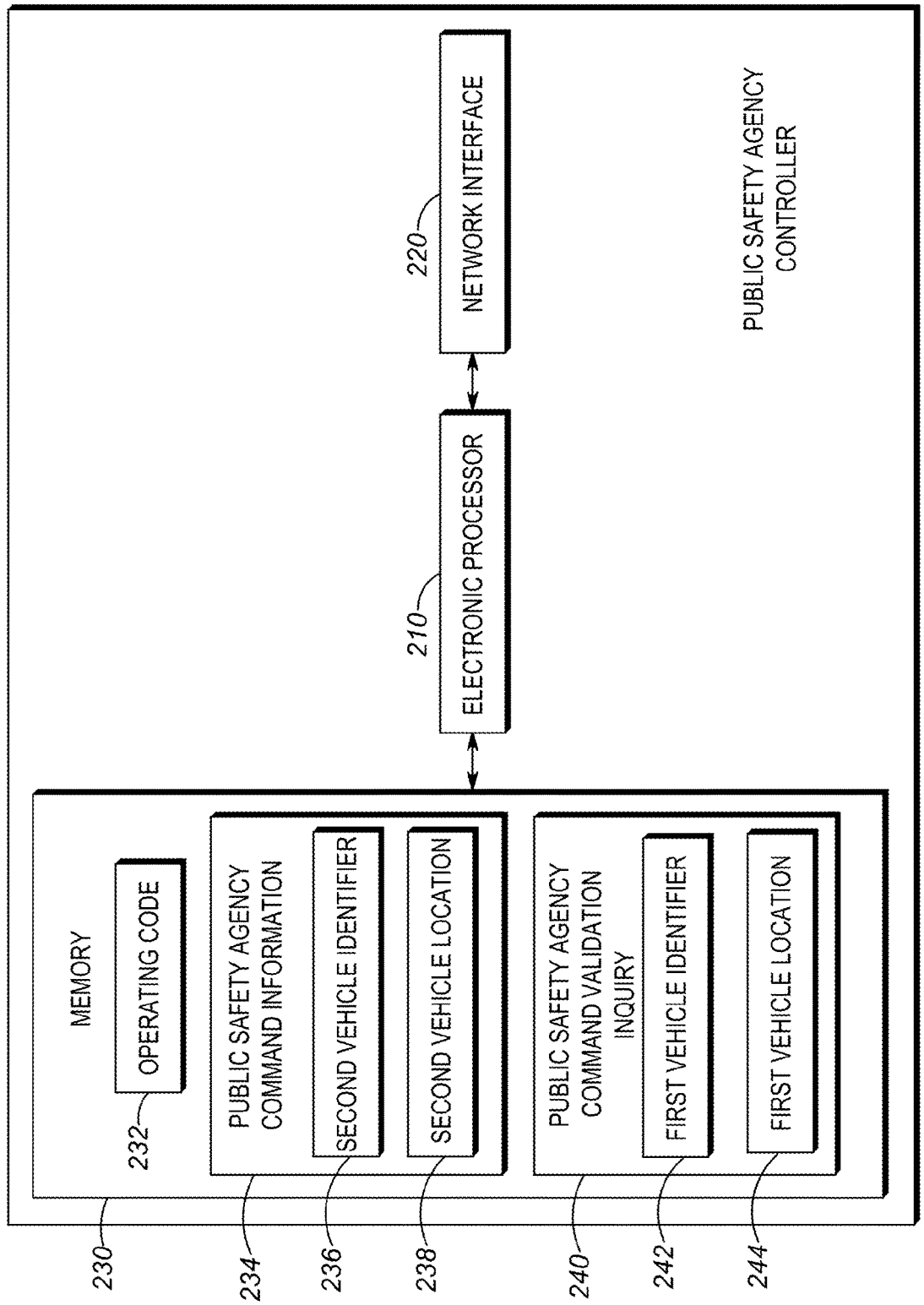
FIG. 2 is a device diagram showing a device structure of a public safety agency controller of the system of FIG. 1 in accordance with some embodiments.

FIG. 2 is a device diagram showing a device structure of a public safety agency controller of the system of FIG. 1 in accordance with some embodiments. The public safety agency controller 110 is implemented at one or more computing devices or servers that are managed and controlled by public safety agencies or third party trusted entities employed for validating the public safety agency commands. In some embodiments, the functionality and components associated with the public safety agency controller 110 are implemented in a distributed manner in different multiple devices or servers employed in the system 100.

As shown in FIG. 2, the public safety agency controller 110 includes an electronic processor 210, for example, a microprocessor, a logic circuit, an application-specific integrated circuit (ASIC), a field-programmable gate array (FPGA), or another electronic device. The electronic processor 210 may include input and output interfaces (not shown) and be electrically connected to a network interface 220 and a memory 230. In some embodiments, the public safety agency controller 110 may include fewer or additional components in configurations different from that illustrated in FIG. 2. For example, in some embodiments, the public safety agency controller 110 may include a display, speaker, and microphone. In some embodiments, the public safety agency controller 110 performs additional functionality than the functionality described below.

The network interface 220 sends and receives data to and from other network entities in the system 100. The network interface 220 may include a transceiver for wirelessly communicating with other network entities in the system 100. Alternatively, or in addition, the network interface 220 may include a connector or port for receiving a wired connection, such as an Ethernet cable. The electronic processor 210 may generate electrical signals and may communicate information relating to the electrical signals through the network interface 220, such as for receipt by the vehicle communication device 150 and/or public safety agency communication device 160 via respective wireless communication links 180, 170. Similarly, the electronic processor 210 may output data received from other network entities through the network interface 220, through a speaker or a display, or a combination thereof.

The memory 230 includes read-only memory (ROM), random-access memory (RAM), other non-transitory computer-readable media, or a combination thereof. For example, the memory 230 may comprise a hard disk drive (HDD), an optical disk drive (ODD) such as a compact disk (CD) drive or digital versatile disc (DVD) drive, a solid-state drive (SSD), a tape drive, a flash memory drive, or a tape drive, to name a few. The memory 230 may store operating code 232 that, when executed by the electronic processor 210, perform the methods described herein.

In accordance with embodiments, the memory 230 may store public safety agency command information 234 including a second vehicle identifier 236 and a second vehicle location 238 received from the public safety agency communication device 160. Also, the memory 230 stores public safety agency command validation inquiry 240 including a first vehicle identifier 242 and a first vehicle location 244 received from the vehicle communication device 150. In one embodiment, the public safety agency command information 234 and public safety agency command validation inquiry 240 are stored in a temporary database. As used herein, the term "temporary database"

refers to a database at the memory 230, where the data is temporarily stored and further removed from the memory 230 either periodically or in response to certain triggers. For example, the data records stored at the temporary database corresponding to the public safety agency command information 234 or public safety agency command validation inquiry 240 are removed from the memory 230 whenever a predefined time period from respectively receiving or generating a record corresponding to the public safety agency command information 234 or public safety agency command validation inquiry 240 elapses. Further, the public safety agency command 120 detected by the vehicle communication device 150 may be determined to be invalid, if no record corresponding to the public safety agency command information currently exists in the temporary database and further if no public safety agency command information is received within a predefined time period (e.g., 5 seconds) from receiving the validation inquiry. The predefined time period may vary depending on the policy employed by public safety agencies. The predefined time period may be manually input at the public safety agency controller 110 or alternatively determined based on machine learning algorithms, for example, that consider the historical time period difference between receiving the public safety agency command information 234 received from the public safety agency communication device 160 and public safety agency command validation inquiry received from the vehicle communication device 150, to determine the predefined time period.

In one embodiment, as described in more detail with reference to the method 400 illustrated in FIG. 4, only the public safety agency command validation inquiry 240 is stored at the memory 230 of the public safety agency controller 110. In this embodiment, the public safety agency controller 110 does not receive the public safety agency command information 234 from the public safety agency communication device 160 and therefore does not store the public safety agency command information 234. Instead, the public safety agency controller 110 forwards the received public safety agency command validation inquiry 240 to the public safety agency communication device 160, where the device 160 itself validates the command validation inquiry 240 by comparing the vehicle identifier 242 and vehicle location 244 included in the command validation inquiry 240 with information corresponding to a public safety agency command 120 detected by the public safety agency communication device 160.

Figure 3:
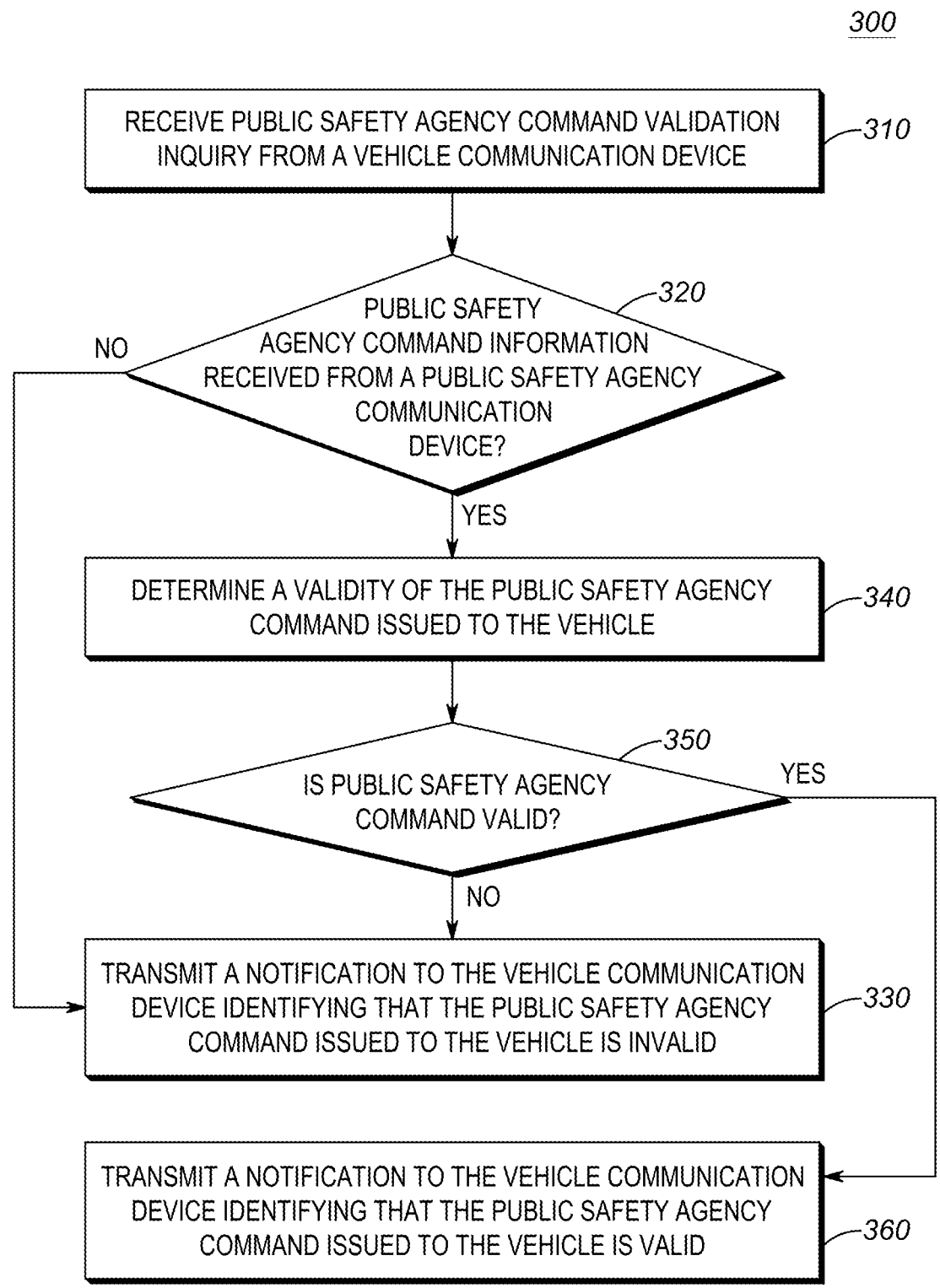
FIG. 3 illustrates a flow chart of a method of operating a public safety agency controller to validate a public safety agency command issued to a vehicle in accordance with some embodiments.

FIG. 3 illustrates a flow chart diagram of a method 300 for operating a public safety agency controller 110 to validate a public safety agency command 120 issued to a target vehicle such as a vehicle 130. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The method 300 shown in FIG. 3 can be performed by one or more components of the public safety agency controller 110, and will be described with reference to the functions and components (i.e., vehicle communication device 150 and public safety agency communication device 160) of the system 100. Some of the features described in the method 300 may be performed by the public safety agency controller 110 using underlying hardware such as an electronic processor 210 implemented at the public safety agency controller 110.

At block 310, the public safety agency controller 110 receives, from a vehicle communication device 150 associated with the vehicle 130, a public safety agency command validation inquiry 240 indicating that the vehicle communication device 150 has detected a public safety agency command 120 issued to the vehicle 130. In one embodiment, the public safety agency controller 110 stores the received public safety agency command validation inquiry 240 received from the vehicle communication device 150, at the memory 230. The public safety agency command validation inquiry 240 includes a first vehicle identifier 242 and a first vehicle location 244 that are determined by the vehicle communication device 150. For example, the first vehicle identifier 242 may include a unique identifier of the vehicle (such as license plate number, vehicle identification number (VIN), or vehicle owner identifier) that is stored at a memory accessible by the vehicle communication device 150. The first vehicle location 244 may correspond to a location at which the vehicle communication device 150 has detected that a public safety agency command 120 has been issued to the vehicle 130. In any case, once the vehicle identifier 242 and vehicle location 244 are determined, the vehicle communication device 150 generates a public safety agency command validation inquiry 240 that includes the vehicle identifier 242 and vehicle location 244. The validation inquiry may include a REST (Representational State Transfer) query to the temporary database maintained at the memory 230 of the public safety agency controller 110. Below is an example REST query that may be sent by the vehicle communication device 150 to the public safety agency controller 110.

POST http://amIbeingstoppedbyofficer.com
with data: {"latitude": "40.7047", "longitude": "-74.0065", "myPlateNumber": "123 ABC"}

Next, at block 320, i.e., in response to receiving the public safety agency command validation inquiry 240 from the vehicle communication device 150, the public safety agency controller 110 determines whether it has received public safety agency command information 234 including a second vehicle identifier 236 and a second vehicle location 238 from a public safety agency communication device 160 associated with a public safety agency officer 140. For example, the second vehicle identifier 236 may include a unique identifier of the vehicle 130 to which the public safety agency command 120 has been issued. The unique identifier of the vehicle 130 may be a license plate number that may be detected using the ALPR software. The second vehicle location 238 may correspond to a location of the public safety agency officer 140 or the vehicle 130.

In one embodiment, after receiving the public safety agency command validation inquiry 240, the public safety agency controller 110 accesses the memory 230 to determine if there is an existing record in the memory 230 that corresponds to a received public safety agency command information 234. If there are no existing records related to receiving public safety agency command information 234 from any public safety agency communication device 160, the public safety agency controller 110 proceeds to block 330 to transmit a notification to the vehicle communication device identifying that the public safety agency command 120 issued to the vehicle 130 is invalid. In some embodiments, the public safety agency controller 110, after determining that there are no existing records related to receiving public safety agency command information 234 from any public safety agency communication device 160, activates a timer to wait for public safety agency command information 234 that may be received from a public safety agency communication device 160 before the timer expires (e.g., within a predefined time period from receiving the public safety agency command validation inquiry 240). In these embodiments, if no public safety agency command information 234 is received from a public safety agency communication device 160 before the timer expires, i.e., within the predefined time period, the public safety agency controller 110 proceeds to block 330 and notifies the vehicle communication device 150 that the command is invalid. However, if the public safety agency controller 110 has already received the public safety agency command information 234 or receives this information 234 before the timer expires, the public safety agency controller 110 proceeds to block 340.

At block 340, after determining that the public safety agency command information 234 has been received from a public safety agency communication device 160, the public safety agency controller 110 determines a validity of the public safety agency command 120 issued to the vehicle 130. In accordance with some embodiments, the public safety agency controller 110 compares the first vehicle identifier 242 with the second vehicle identifier 236 and further compares the first vehicle location 244 with the second vehicle location 238. If the first vehicle identifier 242 is related to the second vehicle identifier 236 and further if the first vehicle location 244 and the second vehicle location 238 are within a predefined geographical distance, then the public safety agency controller 110 determines the validity of the public safety agency command 120 to be valid. For example, in case the first and second vehicle identifiers 242, 236 correspond to license plate numbers, the first vehicle identifier 242 may be determined to be related to the second vehicle identifier 236 when the license plate number associated with the first vehicle identifier 242 matches with the license plate number associated with the second vehicle identifier 236. As another example, in case the first vehicle identifier 242 is a license plate number and the second vehicle identifier 236 is a vehicle owner identifier, the first vehicle identifier 242 may be determined to be related to the second vehicle identifier 236 when the vehicle owner identifier and license plate number are mapped to the same vehicle 130, for example, in a vehicle registration database that can be accessed by the public safety agency controller 110.

However, if one or both of the two conditions are not satisfied i.e., if the first vehicle identifier 242 is not related to the second vehicle identifier 236 or if the first vehicle location 244 and second vehicle location 238 are not within the predefined geographical distance, then the public safety agency controller 110 determines the validity of the public safety agency command 120 to be invalid.

In accordance with some embodiments, the public safety agency controller 110 also further determines at block 340 whether the public safety agency communication device 160 from which the public safety agency command information 234 is received is an authentic device or not. In these embodiments, the public safety agency command information 234 received from the public safety agency communication device 160 may include one or more authentication credentials (e.g., device/user identifier, username-password, digital certificate, encrypted key, biometric data, and the like). The public safety agency controller 110 then determines whether the public safety agency communication device 160 is an authentic device or not based on the authentication credential(s) included in the public safety agency command information 234 received from the public safety agency communication device 160. In case the public safety agency communication device 160 is determined to be not an authentic device, then the public safety agency controller 110 determines the validity of the public safety agency command 120 to be invalid, regardless of the results of comparing the two vehicle identifiers with each other or comparing the two vehicle locations with each other. On the other hand, if the public safety agency communication device 160 is determined to be an authentic device based on the authentication credential included in the public safety agency command information 234 received from the public safety agency communication device 160, the public safety agency controller 110 determines the validity of the public safety agency command 120 to be valid only if the first vehicle identifier 242 is related to the second vehicle identifier 236 and if the first vehicle location 244 and second vehicle location 238 are within the predefined geographical distance.

Next, at block 360, the public safety agency controller 110 determines whether the public safety agency command 120 is determined to be valid at block 340. If the public safety agency command 120 is determined to be valid, the public safety agency controller 110, at block 360, transmits a notification to the vehicle communication device 150 identifying that the public safety agency command 120 issued to the vehicle 130 is valid. In accordance with some embodiments, the public safety agency controller 110, responsive to identifying that the public safety agency command 120 is valid, further identifies, from one of the public safety agency command validation inquiry 240 or public safety agency command information 234, a type of the public safety agency command 120 issued to the vehicle. Then the public safety agency controller 110 generates, based on the type of the public safety agency command 120, an instruction for the vehicle 130 to comply with the public safety agency command 120. In these embodiments, the notification transmitted to the vehicle communication device 150 further includes an instruction for the vehicle 130 to comply with the public safety agency command 120. For example, if the type of public safety agency command 120 indicates a "STOP" signal, then the instruction transmitted to the vehicle communication device 150 includes an indication that the vehicle 130 should be stopped in accordance with the "STOP" procedure. In this case, if the vehicle 130 is an autonomous vehicle, the vehicle controller of the vehicle 130 may control the vehicle to be automatically stopped (e.g., pulled over to side of the road and stopped) based on the specific instruction received from the public safety agency controller 110 via the vehicle communication device 150. As another example, if the type of public safety agency command 120 indicates a "LEFT TURN" signal, the instruction transmitted to the vehicle communication device 150 includes an indication that the vehicle 130 should take a left turn. In this example, the instruction may also include an intersection point on the road at which the vehicle 130 should take a left turn. Other types of command 120 are possible as well.

Returning to block 350, when the public safety agency controller 110 determines that the public safety agency command 120 is invalid, the public agency controller 110, at block 330, transmits a notification to the vehicle communication device 150 identifying that the public safety agency command 120 issued to the vehicle 130 is invalid. In this case, the vehicle communication device 150, responsive to receiving the notification identifying that the public safety agency command 120 is invalid, may take no action or continue driving without complying with or following the public safety agency command 120 detected at the vehicle communication device 150.

In some embodiments, when no public safety agency command information is determined to be received from any public safety agency communication device at block 320, the public safety agency controller 110 may forward the received public safety agency command validation inquiry to a public safety agency communication device 160 associated with a public safety agency officer 140 located within a predefined geographical distance of the first vehicle location 244, prior to transmitting the notification as described in block 360. The process of validating the public safety agency command 120 in accordance with these embodiments is further described below.

Figure 4:
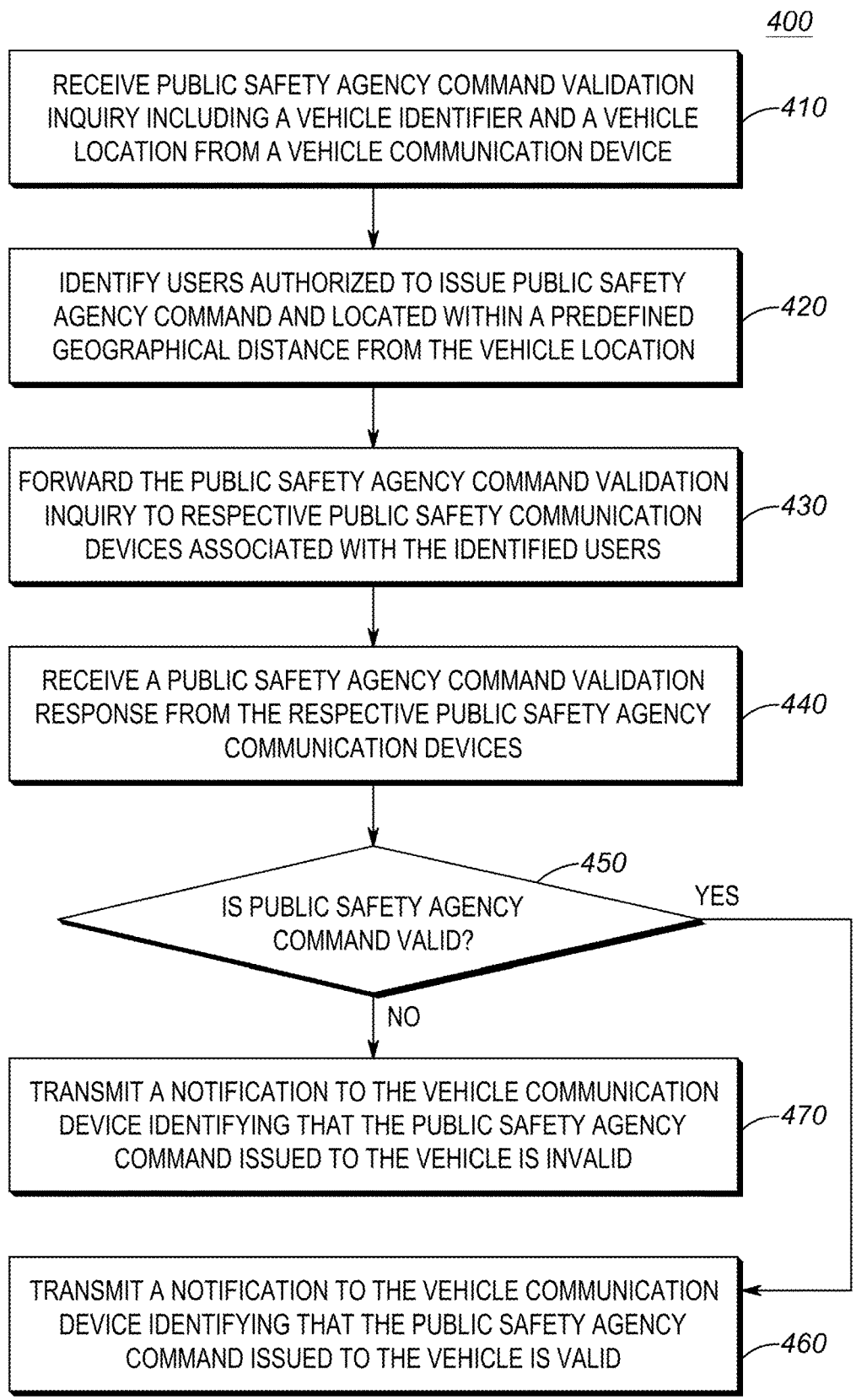
FIG. 4 illustrates a flow chart of another method of operating a public safety agency controller to validate a public safety agency command issued to a vehicle in accordance with some embodiments.

FIG. 4 illustrates a flow chart diagram of a method 400 for operating a public safety agency controller 110 to validate a public safety agency command 120 issued to a target vehicle such as a vehicle 130. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The method 400 shown in FIG. 4 can be performed by one or more components of the public safety agency controller 110, and will be described with reference to the functions and components of (i.e., vehicle communication device 150 and public safety agency communication device 160) the system 100. Some of the features described in the method 400 may be performed by the public safety agency controller 110 using underlying hardware such as an electronic processor 210 implemented at the public safety agency controller 110.

At block 410, the public safety agency controller 110 receives, from a vehicle communication device 150, a public safety agency command validation inquiry 240 indicating that the vehicle communication device 150 has detected a public safety agency command 120 issued to the vehicle 130. In one embodiment, the public safety agency controller 110 stores the public safety agency command validation inquiry 240 received from the vehicle communication device 150, at the memory 230. The public safety agency command validation inquiry 240 includes a first vehicle identifier 242 and a first vehicle location 244 that are determined by the vehicle communication device 150. For example, the first vehicle identifier 242 may include a unique identifier of the vehicle 130 (such as license plate number, Vehicle identification number (VIN), or vehicle owner identifier) that is stored at a memory accessibly by the vehicle communication device 150. The first vehicle location 244 may correspond to a location at which the vehicle communication device 150 has detected that the public safety agency command 120 has been issued to the vehicle 130. In any case, once the first vehicle identifier 242 and first vehicle location 244 are determined, the vehicle communication device 150 generates a public safety agency command validation inquiry 240 that includes the first vehicle identifier 242 and first vehicle location 244.

Next, at block 420, i.e., in response to receiving the public safety agency command validation inquiry 240 from the vehicle communication device 150, the public safety agency controller 110 identifies one or more users (i.e., public safety agency officers 140) who are authorized to issue public safety agency commands 120 and further are located within a predefined geographical distance from the first vehicle location 244. In one embodiment, the public safety agency controller 110 maintains or accesses a database of users who are authorized to issue public safety agency commands 120 and further selects one or more authorized users who are determined as deployed or currently located in proximity (for example, within a predefined geographical distance of 100 meters) to the first vehicle location 244 included in the public safety agency command validation inquiry 240. The location of the users can be determined based on real-time location updates received from the respective public safety agency communication devices 160 associated with the authorized users.

Next, at block 430, the public safety agency controller 110 forwards the public safety agency command validation inquiry 240 including the first vehicle identifier 242 and the first vehicle identifier 242 to respective public safety agency communication devices 160 associated with the one or more users identified at block 420. In accordance with some embodiments, the public safety agency communication device 160 receiving the public safety agency command validation inquiry 240 determines if the device 160 has access to a record corresponding to a public safety agency command 120 that has been detected as being issued to a target vehicle. If there is no record relating to the public safety agency command 120 or if the device 160 does not have access to a record relating to the public safety agency command 120, the public safety agency communication device 160 transmits a public safety agency command validation response indicating that the public safety agency command 120 is invalid. Alternatively, if the device 160 has access to a record relating to the public safety agency command 120, the device 160 respectively compares the first vehicle identifier 242 and first vehicle location 244 included in the public safety agency command validation inquiry 240 with a second vehicle identifier 236 and a second vehicle location 238 included in the record corresponding to the detected public safety agency command 120. The public safety agency communication device 160 may also check if the record corresponds to a recently issued public safety agency command 120, for example, by comparing timestamp of the record with time stamp of the received public safety agency command validation inquiry 240 (or the current time) to check whether the time difference between the two timestamps are within a predefined time period threshold (e.g., 5 seconds). The device 160 then transmits a public safety agency command validation response indicating that the public safety agency command 120 is valid, when the comparison indicates that the two vehicle identifiers 236, 242 are related and the two vehicle locations 238, 244 are within a predefined geographical distance, and further when the timestamps are within the predefined time period threshold. When the timestamps are not within the predefined time period threshold, or when the comparison indicates that the two vehicle identifiers 236, 242 are not related or the two vehicle locations 238, 244 are not within the predefined geographical distance, the public safety agency controller 110 transmits a notification identifying that the public safety agency command 120 is invalid.

Next, at block 440, the public safety agency controller 110 receives the public safety agency command validation response from the respective public safety agency communication devices 160 to which the public safety agency command validation inquiry 240 was forwarded. The received public safety agency command validation response either indicates that the public safety agency command 120 is valid or invalid.

Next, at block 450, the public safety agency controller 110 determines whether the public safety agency command 120 is valid based on the public safety agency command validation responses received from the respective public safety agency communication devices 160 to which the public safety agency command validation inquiry 240 was forwarded. In one embodiment, when the public safety agency command validation inquiry 240 was forwarded to multiple public safety agency communication devices 160, the public safety agency command 120 is determined to be valid if at least one of the public safety agency communication devices 160 transmitted a public safety agency command validation response indicating that the public safety agency command 120 is invalid. On the other hand, if no response is received within a predetermined time period after transmitting the command validation inquiry or if none of the received public safety agency command validation responses indicates that the public safety agency command 120 is valid, then the public safety agency command 120 is determined to be invalid. In these embodiments, the public safety agency controller 110 may also check the authenticity of the respective public safety agency communication devices 160 from which the public safety agency command validation responses were received prior to processing the public safety agency command validation responses.

Next, at block 460, when the public safety agency command 120 is determined to be valid at block 450, the public safety agency controller 110 transmits a notification to the vehicle communication device 150 identifying that the public safety agency command 120 issued to the vehicle 130 is valid. In accordance with some embodiments, the public safety agency controller 110, responsive to identifying that the public safety agency command 120 is valid, further identifies from the public safety agency command validation inquiry 240 or the public safety agency command validation response (which indicates that the command 120 is valid), a type of the public safety agency command 120 issued to the vehicle. Then the public safety agency controller 110 generates, based on the type of the public safety agency command, an instruction for the vehicle 130 to comply with the public safety agency command 120. In these embodiments, the notification transmitted to the vehicle communication device 150 further includes an instruction for the vehicle 130 to comply with the public safety agency command 120. In these embodiments, the notification transmitted to the vehicle communication device 150 further includes an instruction for the vehicle 130 to comply with the public safety agency command. For example, if the type of public safety agency command 120 indicates a "STOP" signal, then the instruction transmitted to the vehicle communication device 150 includes an indication that the vehicle 130 should be stopped in accordance with the "STOP" procedure. In this case, if the vehicle 130 is an autonomous vehicle, the vehicle controller of the vehicle 130 may control the vehicle to be automatically stopped (e.g., pulled over to side of the road and stopped) based on the specific instruction received from the public safety agency controller 110 via the vehicle communication device 150. As another example, if the type of public safety agency command 120 indicates a "RIGHT TURN" signal, the instruction transmitted to the vehicle communication device 150 includes an indication that the vehicle 130 should take a right turn. In this example, the instruction may also include an intersection point on the road at which the vehicle 130 should take a right turn. Other types of command 120 are possible as well.

When the public safety agency controller is determined to be invalid at block 450, the public agency controller 110, at block 470, transmits a notification to the vehicle communication device identifying that the public safety agency command 120 issued to the vehicle is invalid. In this case, the vehicle communication device 150, responsive to receiving the notification identifying that the public safety agency command 120 is invalid, may take no action or may continue driving without complying with or following the public safety agency command 120 detected at the vehicle communication device 150.

In accordance with embodiments described herein, systems, devices, and methods disclosed herein can be advantageously employed to validate public safety agency commands issued to vehicle. The embodiments described herein also further allow autonomous vehicles to automatically respond to issued public safety agency commands based on whether the command is valid or invalid. Also, since the command validation is performed as a function of vehicle locations, vehicle identifiers, authenticity of the officer issuing the command, and authenticity of the agency device detecting the command, the accuracy with which the validation is determined is improved. Further, embodiments described herein can also be similarly applied to validate commands issued to vehicles by private agencies (e.g., security guards at a private premise such as a hotel, apartment, or parking lot) which are lawfully authorized to issue such commands to the vehicle.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a public safety agency controller to validate a public safety agency command issued to a vehicle, the method comprising:
receiving, from a vehicle communication device, a public safety agency command validation inquiry indicating that the vehicle communication device has detected the public safety agency command issued to the vehicle, the public safety agency command validation inquiry including a first vehicle identifier and a first vehicle location;
determining whether public safety agency command information is received from a public safety agency communication device, the public safety agency command information indicating that the public safety agency communication device has detected a public safety agency command issued to the vehicle and further including a second vehicle identifier and a second vehicle location;
responsive to determining that the public safety agency command information is received from the public safety agency communication device, determining a validity of the public safety agency command issued to the vehicle, at least in part, by comparing the first vehicle identifier with the second vehicle identifier and comparing the first vehicle location with the second vehicle location; and
transmitting a notification to the vehicle communication device identifying the validity of the public safety agency command issued to the vehicle.

2. The method of claim 1, wherein determining the validity comprises:
verifying that the public safety agency communication device is an authentic device; and determining the validity of the public safety agency command to be valid when the first vehicle identifier is associated with the second vehicle identifier and when the first vehicle location and the second vehicle location are within a predefined geographical distance.

3. The method of claim 2, wherein the notification identifies that the public safety agency command is valid when the validity of the public safety agency command is determined to be valid.

4. The method of claim 2, wherein responsive to determining the validity of the public safety agency command to be valid, the method comprising:
identifying, from one of the public safety agency command validation inquiry or public safety agency command information, a type of the public safety agency command issued to the vehicle;
generating, based on the type of the public safety agency command, an instruction for the vehicle to comply with the public safety agency command; and
transmitting the notification to the vehicle communication device, wherein the notification includes the instruction for the vehicle to comply with the public safety agency command.

5. The method of claim 4, wherein the vehicle is an autonomous vehicle, and further wherein the instruction causes the autonomous vehicle to automatically comply with the public safety agency command issued to the vehicle when the validity of the public safety agency command is determined to be valid.

6. The method of claim 1, wherein determining the validity comprises one or more of:
determining the validity of the public safety agency command to be invalid when the public safety agency communication device is not an authentic device;
determining the validity of the public safety agency command to be invalid when the first vehicle identifier is not associated with the second vehicle identifier; and
determining the validity of the public safety agency command to be invalid when the first vehicle location and the second vehicle location are not within a predefined geographical distance.

7. The method of claim 6, wherein the notification identifies that the public safety agency command is invalid when the validity of the public safety agency command is determined to be invalid.

8. The method of claim 1, further comprising:
activating, in response to determining that no public safety agency command information is received, a timer;
determining the validity of the public safety agency command to be invalid when no public safety agency command information is received before the tinier expires; and
determining the validity of the public safety agency command to be valid when the public safety agency command information is received from the public safety agency communication device before the timer expires and further when the first vehicle identifier is associated with the second vehicle identifier, the first vehicle location and the second vehicle location are within a predefined geographical distance, and the public safety agency communication device is determined to be an authentic device.

9. The method of claim 1, further comprising:
responsive to receiving the public safety agency command information, generating, at a temporary database accessible by the public safety agency controller, a record corresponding to the received public safety agency command information; and
removing, from the temporary database, the record when a time period since the record is generated exceeds a predefined time period.

10. The method of claim 1, Wherein the first vehicle identifier and second vehicle identifier of the vehicle are selected from the group consisting of:
a license plate number of the vehicle;
a vehicle owner identifier; and
one or more visual or driving characteristics identifying the vehicle including type of the vehicle, color of the vehicle, and vehicle manufacturer identifier.

11. A public safety agency controller, comprising:
a network interface; and
an electronic processor communicatively coupled to the network interface, the electronic processor configured to
receive, via the network interface, from a vehicle communication device, a public safety agency command validation inquiry indicating that the vehicle communication device has detected a public safety agency command issued to a vehicle, the public safety agency command validation inquiry including a first vehicle identifier and a first vehicle location;
determine whether public safety agency command information is received from a public safety agency communication device associated with a public safety agency, the public safety agency command information indicating that the public safety agency communication device has detected the public safety agency command issued to the vehicle and further including a second vehicle identifier and a second vehicle location;
determine a validity of the public safety agency command issued to the vehicle, at least in part, by comparing the first vehicle identifier with the second vehicle identifier and comparing the first vehicle location with the second vehicle location, when it is determined that the public safety agency command information is received from the public safety agency communication device; and
transmit, via the network interface, a notification to the vehicle communication device associated with the vehicle, the notification identifying the validity of the public safety agency command issued to the vehicle.

12. The public safety agency controller of claim 11, wherein the electronic processor is configured to:
verify that the public safety agency communication device is an authentic device;
determine the validity of the public safety agency command to be valid when the first vehicle identifier is associated with the second vehicle identifier and when the first vehicle location and the second vehicle location are within a predefined geographical distance;
identify, from one of the public safety agency command validation inquiry or public safety agency command information, a type of the public safety agency command issued to the vehicle;
generate, based on the type of the public safety agency command, an instruction for the vehicle to comply with the public safety agency command; and
transmit, via the network interface, the notification to the vehicle communication device, including the instruction for the vehicle to comply with the public safety agency command.

13. The public safety agency controller of claim 12, wherein the vehicle is an autonomous vehicle, and further wherein the instruction causes the autonomous vehicle to automatically comply with the public safety agency command issued to the vehicle when the validity of the public safety agency command is determined to be valid.

14. The public safety agency controller of claim 11, further comprises a temporary database for storing a record corresponding to the public safety agency command information received from the public safety agency communication device, wherein the electronic processor is configured to remove the record from the temporary database when a time period since the record is generated in the temporary database exceeds a predefined time period.

15. The public safety agency controller of claim 11, wherein the first vehicle identifier and second vehicle identifier of the vehicle are selected from the group consisting of:
a license plate number of the vehicle;
a vehicle owner identifier; and
one or more visual or driving characteristics identifying the vehicle including type of the vehicle, color of the vehicle, and vehicle manufacturer identifier.

16. A method of operating a public safety agency controller to validate a public safety agency command issued to a vehicle, the method comprising:
receiving, from a vehicle communication device, a public safety agency command validation inquiry indicating that the vehicle communication device has detected the public safety agency command issued to the vehicle, the public safety agency command validation inquiry including a vehicle identifier and a vehicle location;
identifying one or more users authorized to issue a public safety agency command and further located within a predefined geographical distance from the vehicle location;
forwarding the public safety agency command validation inquiry to respective public safety agency communication devices associated with the identified one or more users;
receiving a public safety agency command validation response from the respective public safety agency communication devices;

determining a validity of the public safety agency command based on the public safety agency command validation response received from the respective public safety agency communication devices; and transmitting a notification to the vehicle communication device identifying the validity of the public safety agency command issued to the vehicle.

17. The method of claim 16, wherein determining the validity comprises:

determining the validity of the public safety agency command to be valid when the public safety agency command validation response received from at least one of the respective public safety agency communication devices identifies that the public safety agency command is valid.

18. The method of claim 17, wherein responsive to determining the validity of the public safety agency command to be valid, the method comprising:

identifying, from one of the public safety agency command validation inquiry or public safety agency command validation response, a type of the public safety agency command issued to the vehicle;

generating, based on the type of the public safety agency command, an instruction for the vehicle to corn ply with the public safety agency command; and transmitting the notification to the vehicle communication device identifying that the public safety agency command is valid, wherein the notification includes the instruction for the vehicle to comply with the public safety agency command.

19. The method of claim 16, wherein determining the validity comprises:

determining the validity of the public safety agency command to be invalid when the public safety agency command validation response received from the respective public safety agency communication devices identifies that the public safety agency command is invalid.

20. The method of claim 19, wherein the notification identifies that the public safety agency command is invalid when the validity of the public safety agency is determined to be invalid.

* * * * *